C. L. REESE.
METHOD OF PURIFYING BURNER GAS.
APPLICATION FILED MAY 9, 1910.
989,801.
Patented Apr. 18, 1911.
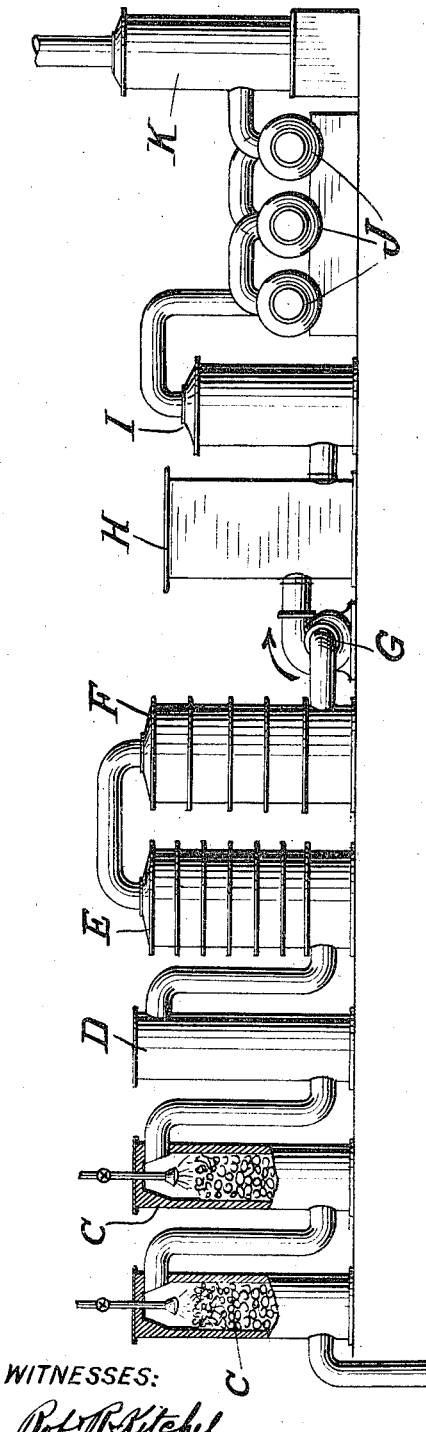
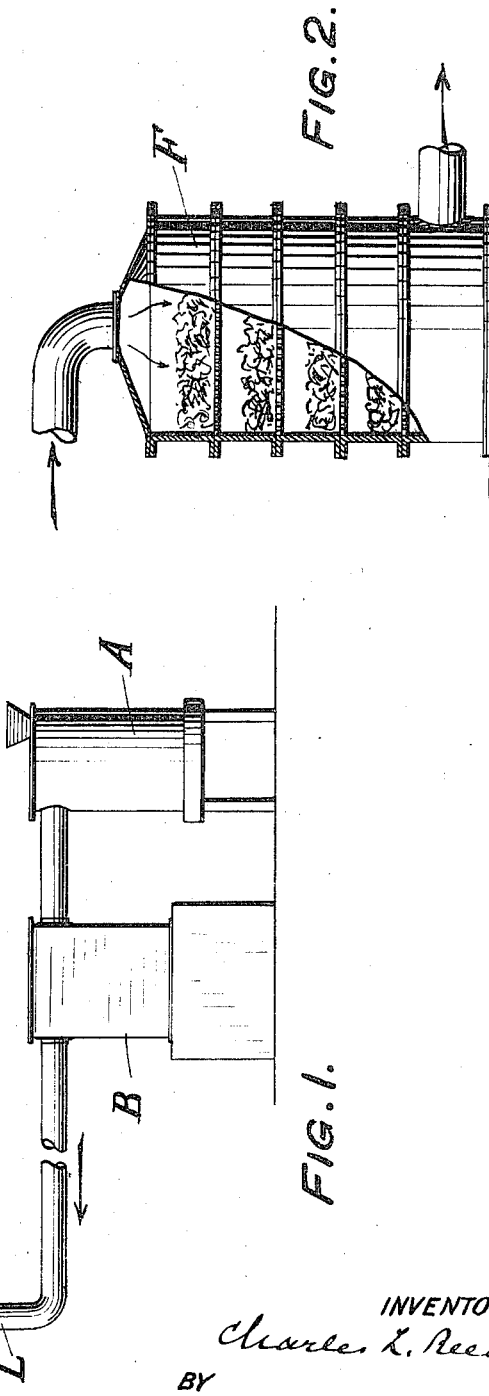
WITNESSES:
Rob. R. Kitchel.
E. E. Wall
INVENTOR
Charles L. Reese
BY
ATTORNEYS.

UNITED STATES PATENT OFFICE.

CHARLES L. REESE, OF WILMINGTON, DELAWARE, ASSIGNOR TO E. I. DUPONT DE NEMOURS POWDER COMPANY, OF WILMINGTON, DELAWARE, A CORPORATION OF NEW JERSEY.

METHOD OF PURIFYING BURNER-GAS.

989,801.  Specification of Letters Patent. Patented Apr. 18, 1911.

Application filed May 9, 1910. Serial No. 560,158.

*To all whom it may concern:*

Be it known that I, CHARLES L. REESE, a citizen of the United States, residing at Wilmington, county of Newcastle, and State of Delaware, have invented a new and useful improvement in methods of purifying burner-gas produced in the manufacture of sulfuric acid from sulfur or sulfur substances or sulfid ores, of which the following is a full, clear, and exact description.

The object of my invention is to remove chlorin, fluorin, arsenic, lead and other impurities carried by sulfuric acid mist present in burner gas produced in the manufacture of sulfuric acid. The minute particles of these impurities form a nucleus for minute globules of sulfuric acid. These impurities lower the yield of sulfuric acid by deteriorating the catalytic used to convert the $SO_2$ to $SO_3$. Efforts have been made to remove these impurities by scrubbing the gas with sulfuric acid and subsequently filtering the gas through fibrous materials like asbestos. It is difficult with this method to maintain the filters in proper condition for any substantial period of time and, further, the method is very expensive. Mineral wool used as a substitute in part for the asbestos lowers the cost but the life of the filter is lessened. The use of alkaline liquids has the objection that the gas becomes saturated with moisture and thus the average strength of the total product of the plant is reduced. I have discovered that if dry lime, oxid, carbonate, or hydrate, be used as the filtering material the removal of these impurities is obtained without any of the disadvantages hereinbefore pointed out.

By tests with my improved filter I have found that the gas coming therefrom is optically pure at all times, *i. e.*, when a beam of sun light is passed through the gas, by means of a lens, no mist could be seen. When the gas passed through a depth of six feet of lime, samples taken from the top showed that arsenic and chlorin and $H_2SO_4$ had been absorbed, whereas samples taken from fifteen inches below the top where the gas entered, showed that practically none of the impurities or sulfuric acid had penetrated.

With my improved method any chlorin, fluorin, arsenic, lead or other solid impurities carried over by the sulfuric acid mist is removed, not only increasing the conversion, but also protecting the pumps or blowers and prolonging the life of the contact mass, and for which latter, with the use of these filters, should be a permanent protection.

Of course, compounds containing lime such, for instance, as dolomite, which contains both CaO and MgO, can be used with the same effect as lime alone.

My invention can be carried out in the apparatus shown in the accompanying drawings in which—

Figure 1 is a general arrangement of the apparatus. Fig. 2 is an enlarged view, partially broken away, of a portion of the apparatus.

Pyrites is burned in burner A. The burner gases are passed first through a dust chamber B, where the heavier dust is deposited, next through cooling flue L, where the excess heat is removed, thence through scrubbers 6 in which the gas is scrubbed and dried with sulfuric acid of about 60° Bé. Thence, through separator D, in which the spray formed in scrubbers is removed. Thence, through a set of filters containing inert material, such as quartz, coke, sand, etc., in which the greater portion of the sulfuric acid mist is removed. Finally, the gas is passed through series of lime filters F, preferably from top to bottom, where the last traces of impurity are removed, due to the combination of the stronger acids with lime and the mechanical retention of impurities carried by the sulfuric acid mist after the latter has been broken up by combination with lime.

The previously described apparatus is maintained under diminished pressure by blower G, from which the gas passes under pressure through preheater H, into converter I, where the $SO_2$ is converted in the presence of contact material to sulfuric anhydrid, which is absorbed by means of sulfuric acid in passing through absorbers J and K. The blower is located preferably after the lime filter, as shown in the drawing, but may be placed at other points in the system as desired.

The gases pass through the filter at a temperature lower than that of 130° Fahrenheit. As may be seen, the burner gases are first cooled, then dried by sulfuric acid and finally passed through a filter containing dry lime, which may be in the form of oxid, carbonate or hydrate. The removal of the impurities is obtained without any of the disadvantages hereinbefore pointed out. The lime combines with any sulfuric acid, which may be present in the gas in the form of mist, and at the same time retains the impurities carried by the sulfuric acid. The lime also combines with any hydrochloric acid and hydrofluoric acid present, but does not combine with the $SO_2$. Neither sulfite nor bisulfite is formed and the lime does not slake, except in quantities equivalent to the sulfuric acid, hydrochloric acid and hydrofluoric acid present in the gas.

Having now fully described my invention, what I claim and desire to protect by Letters Patent is:—

1. The method of removing impurities from burner gases, produced in the manufacture of sulfuric acid, which consists in cooling and drying said gases, and passing the same through a dry lime filter.

2. The method of removing impurities from burner gases, produced in the manufacture of sulfuric acid, which consists in first cooling the burner gases, then drying said gases and then passing said gases through a dry lime filter.

3. The method of removing impurities from burner gases produced in the manufacture of sulfuric acid, which consists in first cooling said gases, then scrubbing said gases with sulfuric acid, and then passing said gases through a dry lime filter.

In testimony of which invention, I have hereunto set my hand, at Wilmington, Delaware, on this 5th day of May, 1910.

CHARLES L. REESE.

Witnesses:
LEON O. BRYAN,
WM. M. WHITTEN, Jr.